United States Patent
Yang et al.

(10) Patent No.: US 11,463,994 B2
(45) Date of Patent: Oct. 4, 2022

(54) METHOD OF SENDING TRANSMISSION CONFIGURATION INDICATION TCI, NETWORK-SIDE DEVICE, AND TERMINAL DEVICE

(71) Applicant: VIVO MOBILE COMMUNICATION CO., LTD., Guangdong (CN)

(72) Inventors: Yu Yang, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 217 days.

(21) Appl. No.: 16/764,807

(22) PCT Filed: Oct. 10, 2018

(86) PCT No.: PCT/CN2018/109682
§ 371 (c)(1),
(2) Date: May 15, 2020

(87) PCT Pub. No.: WO2019/095893
PCT Pub. Date: May 23, 2019

(65) Prior Publication Data
US 2020/0383096 A1    Dec. 3, 2020

(30) Foreign Application Priority Data
Nov. 17, 2017   (CN) .......................... 201711147009.5

(51) Int. Cl.
*H04W 72/04*   (2009.01)
*H04L 5/00*    (2006.01)
*H04B 7/06*    (2006.01)

(52) U.S. Cl.
CPC ....... *H04W 72/0406* (2013.01); *H04L 5/0053* (2013.01)

(58) Field of Classification Search
CPC ......... H04W 72/0406; H04W 72/1247; H04W 72/2142; H04L 5/0094; H04B 7/0695; H04B 7/088
See application file for complete search history.

(56) References Cited

U.S. PATENT DOCUMENTS

| | | | | |
|---|---|---|---|---|
| 4,698,805 A | * | 10/1987 | Sasuta ................... | H04W 84/08 370/327 |
| 2007/0005896 A1 | * | 1/2007 | Chang ................... | G06F 3/0658 711/120 |

(Continued)

FOREIGN PATENT DOCUMENTS

| | | |
|---|---|---|
| CN | 104113397 A | 10/2014 |
| CN | 106304349 A | 1/2017 |
| CN | 106358239 A | 1/2017 |

OTHER PUBLICATIONS

"Discussion on beam management" 3GPP TSG RAN WG1 Meeting #90-bis, Oct. 9, 2017.

(Continued)

*Primary Examiner* — Faruk Hamza
*Assistant Examiner* — Abusayeed M Haque
(74) *Attorney, Agent, or Firm* — Maschoff Brennan

(57) ABSTRACT

A method of sending a TCI, a network-side device and a terminal device are provided. The method includes selecting, based on a link type, a channel, a RS type, or a CORESET, at least one TCI state from configured candidate TCI states, to establish a TCI state table including correspondence between the TCI state and an RS set, or correspondence among the TCI state, the RS set, and a QCL type, or correspondence between the TCI state and a channel type; sending the TCI state table and an identifier of the link type, the channel, the RS type or the CORESET corresponding to the TCI state table.

20 Claims, 3 Drawing Sheets

---

Receiving a TCI state table and an identifier of a link type, a channel, a RS type or a CORESET corresponding to the TCI state table — S210

Establishing a TCI state table corresponding to the link type, the channel, the RS type or the CORESET based on the TCI state table and the identifier of the link type, the channel, the RS type or the CORESET corresponding to the TCI state table — S220

(56) References Cited

U.S. PATENT DOCUMENTS

| | | | |
|---|---|---|---|
| 2009/0187587 A1* | 7/2009 | Chatterjee | G06F 16/22 |
| | | | 707/999.102 |
| 2011/0294527 A1* | 12/2011 | Brueck | H04W 36/0061 |
| | | | 455/466 |
| 2016/0309467 A1* | 10/2016 | Yerramalli | H04W 72/0446 |
| 2017/0318491 A1 | 11/2017 | Chen et al. | |
| 2018/0091276 A1* | 3/2018 | Huang | H04L 5/00 |
| 2018/0157978 A1* | 6/2018 | Buda | G06N 20/00 |
| 2018/0167845 A1 | 6/2018 | Tang et al. | |
| 2019/0141691 A1* | 5/2019 | Kwon | H04L 5/00 |

OTHER PUBLICATIONS

CN Office Action in Application No. 201711147009.5 dated Dec. 26, 2019.
"Discussion on beam indication for UL Transmission" 3GPP TSG RAN WG1 Meeting 90bis, Oct. 9, 2017.
Written Opinion and International Search Report in Application No. PCT/CN2018/109682 dated May 28, 2020.
EP Search Report in Application No. 18879710.4 dated Nov. 16, 2020.
"Beam indication for control and data channels" 3GPP TSG RAN WG1 Meeting 90bis, Oct. 9, 2017.
"Summary of QCL" 3GPP TSG-RAN WG1 Meeting #90bis, Oct. 9, 2017.

* cited by examiner

METHOD OF SENDING TRANSMISSION CONFIGURATION INDICATION TCI, NETWORK-SIDE DEVICE, AND TERMINAL DEVICE

CROSS-REFERENCE TO RELATED APPLICATION

This application is the U.S. national phase of PCT Application No. PCT/CN2018/109682 filed on Oct. 10, 2018, which claims a priority to Chinese Patent Application No. 201711147009.5 filed on Nov. 17, 2017, the disclosures of which are incorporated in their entirety by reference herein

TECHNICAL FIELD

Embodiments of the present invention relate to the field of communication/terminal device, and more particularly, relates to a method of sending a TCI, a network-side device and a terminal device.

BACKGROUND

Standards of radio access technologies such as Long Term Evolution (LTE)/LTE-Advanced (LTE-A) are all based on Multiple-Input Multiple-Output (MIMO) technology+Orthogonal Frequency Division Multiplexing (OFDM) technology. The MIMO technology uses a spatial freedom degree that can be obtained by a multi-antenna system to improve a peak rate and a utilization rate of system spectrum. During development of standardization, dimensions of the MIMO technology are constantly expanded, and in LTE Rel-8, up to 4-layer MIMO transmission can be supported; in Rel-9, MU-MIMO (Multi-User MIMO) technology is enhanced, and in Transmission Mode (TM)-8, the MU-MIMO transmission can support a maximum of 4 downlink data layers; and a Single-User MIMO (SU-MIMO) transmission capability is extended to a maximum of 8 data layers in Rel-10. It is foreseen that MIMO technology supporting larger scale and more antenna ports will be introduced in a future Fifth-Generation (5G) mobile communication system.

However, with development of the MIMO technology, a solution of indicating a Transmission Configuration Indication (TCI) state cannot satisfy complicated requirements of 5G application scenarios.

SUMMARY

An objective of the embodiments of the present invention is to provide a method of sending a TCI, a network-side device and a terminal device, which are capable of activating a TCI state table corresponding to a communication resource for the terminal device according to a classification of the communication resource, thereby enabling configuration of a TCI state table at a network side and configuration of a TCI state table at a terminal device side to be more flexible.

In a first aspect, a method of sending a TCI state is provided. The method includes: selecting, based on a link type, a channel, a Reference Signal (RS) type, or a Control Resource Set (CORESET), at least one TCI state from a plurality of candidate TCI states configured in advance, to establish a TCI state table, wherein the TCI state table includes correspondence relationship between the TCI state and an RS set, correspondence relationship among the TCI state, the RS set, and a Quasi-Co-Location (QCL) type, or correspondence relationship between the TCI state and a channel type; sending the TCI state table and an identifier of the link type, the channel, the RS type or the CORESET corresponding to the TCI state table.

In a second aspect, a method of sending a TCI state is provided. The method includes: receiving a TCI state table and an identifier of a link type, a channel, a Reference Signal (RS) type or a Control Resource Set (CORESET) corresponding to the TCI state table, wherein the TCI state table is generated by a network-side device through selecting, based on the link type, the channel, the RS type or the CORESET, at least one TCI state from a plurality of candidate TCI states configured in advance, the TCI state table includes correspondence relationship between a TCI state and an RS set, or correspondence relationship among the TCI state, the RS set, and a QCL type, or correspondence relationship between the TCI state and a channel type; establishing a TCI state table corresponding to the link type, the channel, the RS type or the CORESET based on the TCI state table and the identifier of the link type, the channel, the RS type or the CORESET corresponding to the TCI state table.

In a third aspect, a network-side device is provided. The network-side device includes: an establishing unit, used for selecting, based on a link type, a channel, a Reference Signal (RS) type, or a Control Resource Set (CORESET), at least one Transmission Configuration Indication (TCI) state from a plurality of candidate TCI states configured in advance, to establish a TCI state table, wherein the TCI state table includes correspondence relationship between a TCI state and an RS set, or correspondence relationship among the TCI state, the RS set, and a Quasi-Co-Location (QCL) type, or correspondence relationship between the TCI state and a channel type; a sending unit, used for sending the TCI state table and an identifier of the link type, the channel, the RS type or the CORESET corresponding to the TCI state table.

In a fourth aspect, a terminal device is provided. The terminal device includes: a receiving unit, used for receiving a TCI state table and an identifier of a link type, a channel, a Reference Signal (RS) type or a Control Resource Set (CORESET) corresponding to the TCI state table, wherein the TCI state table is generated by a network-side device through selecting, based on the link type, the channel, the RS type or the CORESET, at least one TCI state from a plurality of candidate TCI states configured in advance, the TCI state table includes correspondence relationship between a TCI state and an RS set, or correspondence relationship among the TCI state, the RS set, and a QCL type, or correspondence relationship between the TCI state and a channel type; an establishing unit, used for establishing a TCI state table corresponding to the link type, the channel, the RS type or the CORESET based on the TCI state table and the identifier of the link type, the channel, the RS type or the CORESET corresponding to the TCI state table.

In a fifth aspect, a network-side device is provided. The network-side device includes a processor, a storage and a computer program stored on the storage and executable by the processor, wherein when the computer program is executed by the processor, the processor implements steps of the method according to the first aspect.

In a sixth aspect, a terminal device is provided. The terminal device includes a processor, a storage and a computer program stored on the storage and executable by the processor, wherein when the computer program is executed by the processor, the processor implements steps of the method according to the second aspect.

In a seventh aspect, a computer readable storage medium is provided. The computer readable storage medium stores a computer program. When the computer program is executed by a processor, the processor implements the steps of the method as described in the first aspect, or the steps of the method as described in the second aspect.

In the embodiments of the present invention, the TCI state table corresponding to the communication resource is activated for the terminal device accord to the classification of the communication resource, and sent to the terminal device, so that the configuration of the TCI state table at the network side and the configuration of the TCI state table at terminal device side are more flexible.

BRIEF DESCRIPTION OF THE DRAWINGS

Accompanying drawings described herein are intended to provide a further understanding of the present invention and form a part of the present invention, and exemplary embodiments of the present invention and descriptions thereof are intended to explain the present invention but are not intended to unduly limit the present invention. In the drawings.

DETAILED DESCRIPTION

The technical solution in the embodiments of the present invention will be clearly and completely described below in conjunction with the accompany drawings in the embodiments of the present invention, and it is obvious that the described embodiment are a part, rather than all, of the embodiments of the present invention. Based on the embodiments of the present invention, all other embodiments obtained by those of ordinary skill in the art without creative labor are within the protection scope of the present invention.

The technical solutions of the embodiments of the present invention can be applied to various communication systems, such as a Global System of Mobile Communication (GSM), a Code Division Multiple Access (CDMA) system, and a Wideband Code Division Multiple Access (WCDMA), a General Packet Radio Service (GPRS), a Long Term Evolution (LTE)/Long Term Evolution Advanced (LTE-A), NR (New Radio), etc.

A UE (User Equipment) may also be called a Mobile Terminal, a Terminal Device, or a mobile user device, and may communicate with one or more core networks via a radio access network (e.g., RAN (Radio Access Network)). The UE may be a terminal device such as a mobile phone (or a "cellular" phone) and a computer having the terminal device, for example, a portable device, a pocket-sized device, a handheld device, a computer-built device or an on-board mobile device, which exchange language and/or data with the radio access network.

A base station may be a Base Transceiver Station (BTS) in the GSM or the CDMA, a NodeB in the WCDMA, or an evolutional Node B (eNB or e-NodeB) in the LTE, and a 5G base station (gNB). The present invention are not limited to the examples. However, for convenience of description, the following embodiments are described by taking the gNB as an example.

Figure 1:
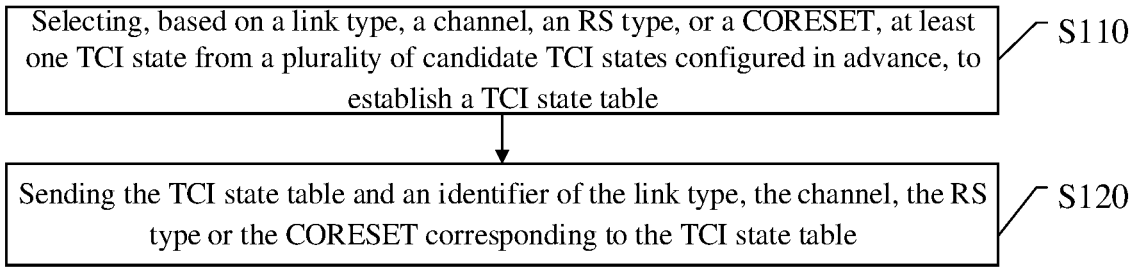
FIG. 1 is a flowchart of a method of sending a TCI state according to an embodiment of the present invention.

FIG. 1 is a flowchart of a method of sending a TCI state according to an embodiment of the present invention. The method of FIG. 1 is performed by a network-side device. In the embodiments of the present invention, the network-side device may be a Base Transceiver Station (BTS) in the GSM or the CDMA, a NodeB in the WCDMA, or an evolutional Node B (eNB or e-NodeB) in the LTE, and a 5G base station (gNB) or other devices that implement a network-side function of a communication system beyond 5G. The method of FIG. 1 may include steps of S110-S120.

S110: selecting, based on a link type, a channel, an RS type, or a CORESET, at least one TCI state from a plurality of candidate TCI states configured in advance, to establish a TCI state table.

The TCI state table includes correspondence relationship between a TCI state and an RS set, correspondence relationship among the TCI state, the RS set, and a Quasi-Co-Location (QCL) type, or correspondence relationship between the TCI state and a channel type.

A Control Resource Set (CORESET) is formed by $N_{RB}^{CORESET}$ Resource Blocks (RBs) in a frequency domain, and is formed by $N_{symb}^{CORESET} \in \{1,2,3\}$ symbols in a time domain. The $N_{RB}^{CORESET}$ is given by a high-layer parameter CORESET-freq-dom, the $N_{symb}^{CORESET}$ is given by a high-layer parameter CORESET-time-dur. In particular, $N_{symb}^{CORESET}=3$ is supported in a case that a high-layer parameter DL-DMRS-typeA-pos=3.

It should be understood that before step S110, the network-side device may also configure a plurality of candidate TCI states for the terminal device based on the link type. It should be understood that the plurality of candidate TCI states configured based on an uplink and the plurality of candidate TCI states configured based on a downlink may be the same or different.

In some embodiments of the present invention, a TCI state table corresponding to the link type may be established based on the link type, for example, the TCI state table corresponding to a downlink or the TCI state table corresponding to an uplink.

In some embodiments of the present invention, a TCI state table corresponding to the channel may also be established based on the channel, for example, a TCI state table corresponding to a control channel, or a TCI state table corresponding to a data channel. Further, a TCI state table corresponding to an uplink control channel, or a TCI state table corresponding to a downlink data channel, or the like may also be established.

In some embodiments of the present invention, TCI state table corresponding to the RS type may also be established based on the RS type. The RS type, for example, may include a Synchronous Signal block (SS block), a periodic Channel State Information reference signal (CSI-RS), an aperiodic CSI-RS, a semi-persistent CSI-RS, and a periodic channel Sounding Reference Signal (SRS), an aperiodic SRS, a semi-persistent SRS, a Tracking Reference Signal (TRS), and the like.

In some embodiments of the present invention, a TCI state table corresponding to different CORESETs may also be established based on the CORESETs.

Of course, it should be understood that at least one TCI state activated based on different link types, channels, RS types, or CORESETs may be the same or different.

S120: sending the TCI state table and an identifier of the link type, the channel, the RS type or the CORESET corresponding to the TCI state table.

It should be understood that, in some embodiments of the present invention, the TCI state table and the identifier of the link type, the channel, the RS type or the CORESET corresponding to the TCI state table may be activation information for activating the TCI state table of the terminal device. In one implementation, the activation information may be transmitted through a Medium Access Control (MAC) Control Element (CE) message.

In the embodiments of the present invention, by establishing a corresponding TCI state table based on the link type, the channel, the RS type or the CORESET, the corresponding TCI state table can be configured for the terminal device according to needs of application scenarios, thereby satisfying TCI state indication requirements in different scenarios.

Optionally, in the embodiments of the present invention, each TCI state in the TCI state table corresponds to one or more RS sets in a case that the TCI state table includes correspondence relationship between the TCI state and the RS set. A specific TCI state table may be shown in Table 1.

TABLE 1

| TCI state | RS set |
| --- | --- |
| 0 | Set 0 |
| 1 | Set 1 |
| 2 | Set 2, Set 3 |
| ... | ... |

In Table 1, in a case that the TCI state is 0, the TCI state corresponds to one RS set (Set 0), and in a case that the TCI state is 2, the TCI state corresponds to two RS sets (Set 2, Set 3).

Further, each RS set includes one or more RSs.

It should be understood that, in some embodiments of the present application, one RS set may include one RS or a plurality of RSs.

For example, if there are 32 transmission beam directions and only one RS is configured in one RS set, the terminal device may poll and measure a received power of the RS on 32 transmission beams in a time-division manner. In a case that 32 RSs are configured in the RS set, reception powers of an RS or the like on the 32 transmission beams may be measured, respectively, for the 32 RSs. Of course, the terminal device may select different processing strategies for different configurations, and the embodiments of the present invention are not limited thereto, and explanation herein is only for ease of understanding.

Further, in a case that one RS set includes a plurality of RSs, types of the plurality of RSs included in the RS set may be the same or different.

For example, all of the RSs of one RS set may be non-periodic CSI-RSs, or a part of the RSs of the RS set may be periodic CSI-RSs, a part of the RSs of the RS set may be semi-persistent CSI-RSs, and so on.

In the embodiments of the present invention, one or more RSs in the RS set indicated by the TCI state can be flexible and diversified so as to be adapted to a plurality of different scene requirements.

Optionally, as one embodiment, each TCI state in the TCI state table corresponds to one QCL type in a case that the correspondence relationship among the TCI state, the RS set, and the QCL type is included in the TCI state table.

In the embodiments of the present invention, a TCI state corresponds to a QCL type, and in a case that a network-side device sends TCI state indication information carrying the TCI state, the terminal device can directly obtain, from the TCI state, the QCL type indicated by the TCI state.

It should be understood that the QCL type may include a spatial QCL parameter and a QCL time-frequency parameter.

A specific TCI state table may be shown in Table 2.

TABLE 2

| TCI state | RS set | QCL type |
| --- | --- | --- |
| 0 | Set 0 | Spatial QCL parameter |
| 1 | Set 1 | QCL time-frequency parameter |
| 2 | Set 2 | Spatial QCL parameter |

In Table 2, in a case that the TCI state is 0, the TCI state corresponds to 1 QCL type (Spatial QCL parameter); or in a case that the TCI state is 1, the TCI state corresponds to 1 QCL type (QCL time-frequency parameter).

Optionally, as another embodiment, each RS set in the TCI state table corresponds to a QCL type in a case that the correspondence relationship among the TCI state, the RS set, and the QCL type is included in the TCI state table.

A specific TCI state table may be shown in Table 3.

TABLE 3

| TCI state | RS set | QCL type |
| --- | --- | --- |
| 0 | Set 0 | Spatial QCL parameter |
|   | Set 1 | QCL time-frequency parameter |
| 1 | Set 2 | Spatial QCL parameter |

In Table 3, two RS sets (Set 0 and Set 1) correspond to the TCI state 0, wherein each RS set corresponds to one QCL type (Set 0 corresponds to the Spatial QCL parameter and Set 1 corresponds to the QCL time-frequency parameter).

Optionally, as another embodiment, at least one RS set in the TCI state table corresponds to a plurality of QCL types in a case that the correspondence relationship among the TCI state, the RS set, and the QCL type is included in the TCI state table. That is, at least 2 RSs in a certain RS set of the TCI state table correspond to different QCL types, respectively. A specific TCI state table may be shown in Table 4.

TABLE 4

| TCI state | RS set | RS ID | QCL type |
| --- | --- | --- | --- |
| 0 | Set 0 | CSI-RS resource index | Spatial QCL parameter |
| 1 | Set 1 | TRS resource index | QCL time-frequency parameter |
|   |   | SRS resource index | Spatial QCL parameter |

In Table 4, set 1 includes two RSs, i.e., a TRS resource index and an SRS resource index, wherein the TRS resource index corresponds to the QCL time-frequency parameter and the SRS resource index corresponds to the Spatial QCL parameter.

Optionally, after step S120, the method may further include: sending TCI state indication information, wherein the TCI state indication information carries a target TCI state in the TCI state table.

It should be understood that the TCI state indication information may have different usages depending on different application scenarios.

For example, in a case that the QCL type indicated by the TCI state indication information is the spatial QCL parameter, the TCI state indication information is used for beam indication. In one condition, the TCI state indication information may be used to instruct the terminal device to perform beam-training by measuring a beam and reporting a result of measuring the beam; and in another condition, the TCI state indication information may be used to indicate the terminal device to perform transmission of a control signaling, a data signal or a reference signal, including transmission of an uplink signal and reception of a downlink signal, on a corresponding beam.

For example, in a case that the QCL type indicated by the TCI state indication information is the time-frequency QCL parameter, time-frequency resources for transmission of the control signaling, the data signal, the reference signal, or the like may be indicated to be selected by the terminal device. The network-side device may instruct, in downlink through the TCI state indication information, the terminal device to receive the control signaling, the data signal or the reference signal on a corresponding time-frequency resource. The network-side device may instruct, through the TCI state indication information, the terminal device to transmit the control signaling, the data signal, or the reference signal on the corresponding time-frequency resource in uplink.

Optionally, as one embodiment, the TCI state indication information further carries a QCL type indication and/or an RS type indication, wherein, the RS type is used to indicate the type of RS for beam measurement, selected by the terminal device, in the RS set corresponding to a target TCI state, in a case that the RSs in the RS set corresponding to the target TCI state have a plurality of RS types.

The QCL type indication is used to indicate, to the terminal device, a QCL type of a communication resource for reception or transmission, in a case that the target TCI state corresponds to a plurality of QCL types.

For example, taking Table 4 as an example, in a case that the TCI state of the network-side device in the TCI state indication information is 1, since there are two RS types in the RS set corresponding to the TCI state 1, an indication of an RS type may also be added to the TCI state indication information. For example, the indication of the RS type indicates the TRS using 1, indicates the SRS using 0, and so on.

For another example, taking Table 4 as an example, in a case that the TCI state of the network-side device in the TCI state indication information is 1, the QCL type indication may be added to the TCI state indication information because the TCI state 1 corresponds to two QCL types. For example, the QCL type indication indicates the QCL time-frequency parameter using 1 and indicates the Spatial QCL parameter using 0.

Of course, it should be understood that in the embodiments of the present invention, the communication resource may be a CORESET, a channel resource or a reference signal resources, and the like.

Optionally, pre-defined mapping relationship exists between the RS type of an RS in the RS set corresponding to the target TCI state and the QCL type corresponding to the target TCI state, each RS type corresponds to a QCL type.

Optionally, as another embodiment, in a case that the RSs in the RS set corresponding to the target TCI state have a plurality of RS types, an RS type having the highest priority level, according to a pre-defined order of priority levels of RS types, among the plurality of RS types is used as the RS type indicated to be selected by the terminal device.

For example, in a case that the RS set corresponding to the TCI state includes the CSI-RS and the SS block, and a priority level of the CSI-RS is specified in advance to be high, the RS type indication needs not to be carried in the TCI state indication information, but the CSI-RS having the high priority level is used by default.

Optionally, as yet another embodiment, in a case that at least one QCL type corresponding to the target TCI state in the TCI state table corresponds to a plurality of RS types, an RS type having the highest priority level, according to a pre-defined order of priority levels of RS types, among the plurality of RS types corresponding to the at least one QCL type carried in the TCI state indication information is used as the RS type indicated to be selected by the terminal device.

For example, in a case that the RS set corresponding to the TCI state includes the CSI-RS and the SS block and the priority level of the CSI-RS is specified in advance to be high, the RS type indication needs not to be carried in the TCI state indication information, but a QCL parameter of the CSI-RS having the high priority level is used by default. In a case that the TCI state corresponds to a plurality of QCL types, such as the spatial QCL parameter and the QCL time-frequency parameter, the spatial QCL parameter corresponds to the CSI-RS and the SS block, and the priority level of the CSI-RS is specified in advance to be high, then in a case that spatial QCL indication information is carried in the TCI state indication information, the spatial QCL parameter of the CSI-RS having the high priority level corresponding to the spatial QCL indication information is used by default.

Optionally, as yet another embodiment, in a case that the target TCI state is used to indicate a TCI state of a control channel, the TCI state indication information is sent through a Radio Resource Control (RRC) protocol message, or is sent jointly through a RRC message and a Media Access Control (MAC) Control Element (CE) message.

Optionally, as yet another embodiment, in a case that the target TCI state is used to indicate a TCI state of a data channel, the TCI state indication information is sent through a Downlink Control Information (DCI) message.

Optionally, as yet another embodiment, in a case that the target TCI state is used to indicate the TCI state of a data channel, the TCI state indication information is sent through an RRC message, or is sent jointly through an RRC message and a MAC CE message.

Further, if the TCI state of a data channel is to be sent and the TCI state needs to be sent through the DCI message and a signaling field for sending the TCI state is disabled in the DCI message, then before sending the DCI message, the methods further includes: indicating the signaling field, for sending the TCI state, to be enabled in the DCI message, through sending an RRC message or a MAC CE message.

Further, in a case that the target TCI state is used to indicate a TCI state of a control channel, the target TCI state is further used to indicate the TCI state of a data channel.

Optionally, as yet another embodiment, in a case that the target TCI state is used to indicate a TCI state of a reference signal and the type of the reference signal belongs to a periodic reference signal or a semi-persistent reference signal, the TCI state indication information is sent through an RRC message, or is sent jointly through an RRC message and a MAC CE message.

Optionally, as yet another embodiment, in a case that the target TCI state is used to indicate a TCI state of a reference signal and the type of the reference signal belongs to an aperiodic reference signal, the TCI state indication information is sent through a DCI message.

Further, in one implementation of this embodiment, in a case that the target TCI state is used to indicate the TCI state of the reference signal and the reference signal is an aperiodic CSI-RS, the TCI state indication information may be sent through a new DCI format other than an existing DCI format.

Optionally, in one implementation of this embodiment, in a case that the target TCI state is used to indicate the TCI state of the reference signal and the reference signal is an aperiodic CSI-RS, the TCI state indication information may be sent through a new signaling bit added in the existing DCI format.

Optionally, further, in one implementation of this embodiment, in a case that the target TCI state is used to indicate the TCI state of the reference signal and the reference signal is an aperiodic CSI-RS, the TCI state indication information may be sent through a signaling bit state reserved in the existing DCI format.

It should be understood that if there are N TCI states in the TCI state table, and $2^{n-1} < N \leq 2^n$, then at least the n bits are needed for indicating the TCI states. Optionally, in the embodiments of the present application, a value of the N may be $2^n$.

In particular, in a case that the TCI state indication information is transmitted using the DCI message, TCI state indication information indicating a TCI state of a Physical Downlink Shared Channel (PDSCH) may also be present in the DCI message.

It should be understood that in an existing DCI format for TCI state indication, a TCI indication field for indicating the TCI state of the PDSCH may be included. In the embodiments of the present invention, if a new signaling bit in the existing DCI format for indicating the TCI state is used to represent the TCI state of the aperiodic CSI-RS, then TCI state indication information indicating the TCI state of the aperiodic CSI-RS and TCI state indication information indicating the TCI state of the PDSCH may both exist in the DCI format.

In the embodiment of the present invention, the TCI state indication information is sent by adding a new signaling bit in the existing DCI format of the existing DCI message, or the TCI state indication information is sent by using a reserved signaling bit state in the existing DCI format of the existing DCI message. Thus, the DCI message includes, in addition to the TCI signaling field for indicating the TCI state of the PDSCH, another TCI signaling field for the TCI state indication information of the aperiodic CSI-RS in the embodiments of the present invention.

Optionally, the signaling bit carrying the TCI state indication information for indicating the TCI state of the aperiodic CSI-RS in the DCI message is fixed to be occupied by the indicated TCI state of the aperiodic CSI-RS, and is not allowed to be disabled through an RRC message.

In the related art, the TCI signaling field, in the DCI, for indicating the TCI state of the PDSCH may be disabled by an RRC message, whereas in the DCI of the embodiments of the present invention, the TCI signaling field for indicating the TCI state of the aperiodic CSI-RS is not allowed to be disabled through an RRC message, and is always enabled.

Optionally, as yet another embodiment, in a case that the TCI state table is a TCI state table corresponding to a Physical Uplink Control Channel (PUCCH), and the TCI state table includes correspondence relationship between a TCI state and a channel type, the target TCI state indicates that the same QCL parameter is used for both the PUCCH and the channel type.

Specifically, in a case that the correspondence relationship between the TCI state and the channel type is included in the TCI state table activated and established for the PUCCH, for example, the channel type is PDCCH or PDSCH, indicating that the UE has beam consistency, i.e., an uplink transmission beam and a downlink reception beam are consistent, then a beam for the PDCCH or the PDSCH indicated by the TCI state indication information of the PUCCH is used to receive the PUCCH.

Figure 2:
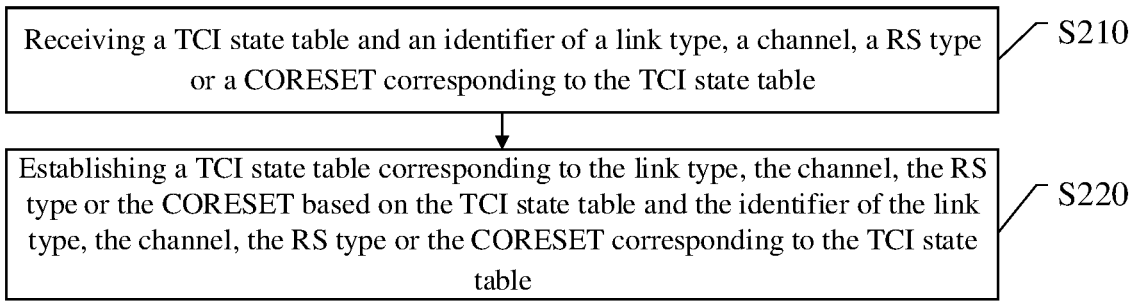
FIG. 2 is a flowchart of a method of sending a TCI state according to another embodiment of the present invention.

FIG. 2 is a flowchart of a method of sending a TCI state according to another embodiment of the present invention. The method of FIG. 2 is performed by a terminal device. The method of FIG. 2 may include steps of S210-S220.

S210: receiving a TCI state table and an identifier of a link type, a channel, a RS type or a CORESET corresponding to the TCI state table, wherein the TCI state table is generated by a network-side device through selecting, based on the link type, the channel, the RS type or the CORESET, at least one TCI state from a plurality of candidate TCI states configured in advance, the TCI state table includes correspondence relationship between a TCI state and an RS set, or correspondence relationship among the TCI state, the RS set, and a QCL type, or correspondence relationship between the TCI state and a channel type.

Of course, it should be understood that before step S210, the terminal device may also receive the plurality of candidate TCI states configured by the network-side device based on the link type. It should be understood that the plurality of candidate TCI states configured based on an uplink and the plurality of candidate TCI states configured based on a downlink may be the same or different. It should be understood that the terminal device may generally receive configuration information of the plurality of candidate TCI states through an RRC signaling.

It should be understood that at least one TCI state, in the received TCI state table, activated based on different link types, channels, RS types, or CORESETs may be the same or different.

It should be understood that the TCI state table and the identifier of the link type, the channel, the RS type or the CORESET corresponding to the TCI state table may be collectively referred to as activation information.

S220: establishing a TCI state table corresponding to the link type, the channel, the RS type or the CORESET based on the TCI state table and the identifier of the link type, the channel, the RS type or the CORESET corresponding to the TCI state table.

In the embodiments of the present invention, through receiving the activation information of a corresponding TCI state table established by the network-side device based on the link type, the channel, the RS type, the CORESET or the like, the TCL state table of the terminal device is established. Thus, the corresponding TCI state table can be configured for the terminal device according to requirements of application scenarios, and further TCI state indication requirements in various scenarios may be satisfied.

Optionally, in the embodiments of the present invention, each TCI state in the TCI state table corresponds to one or more RS sets in a case that the TCI state table includes the correspondence relationship between the TCI state and the RS set.

Further, each RS set includes one or more RSs.

Further, in a case that one of the one or more RS sets includes a plurality of RSs, types of the plurality of RSs included in the RS set may be the same or different.

In the embodiments of the present invention, one or more RSs in the RS set indicated by the TCI state can be flexible and diversified so as to be adapted to a plurality of different scene requirements.

Optionally, as an embodiment, each TCI state in the TCI state table corresponds to one QCL type in a case that the correspondence relationship among the TCI state, the RS set, and the QCL type is included in the TCI state table.

In the embodiments of the present invention, a TCI state corresponds to a QCL type, and in a case that a network-side device sends TCI state indication information carrying the TCI state, the terminal device can directly obtain, from the TCI state, the QCL type indicated by the TCI state.

It should be understood that the QCL type may include a spatial QCL parameter and a QCL time-frequency parameter.

Optionally, as another embodiment, each RS set in the TCI state table corresponds to a QCL type in a case that the correspondence relationship among the TCI state, the RS set, and the QCL type is included in the TCI state table.

In some embodiments of the present invention, an RS set may also be associated with a QCL type, and an RS set corresponds to a QCL type.

Optionally, as another embodiment, at least one RS set in the TCI state table corresponds to a plurality of QCL types in a case that the correspondence relationship among the TCI state, the RS set, and the QCL type is included in the TCI state table.

In the embodiments of the present invention, if an RS set corresponding to a TCI state table includes a plurality of RSs, QCL types corresponding to the plurality of RSs may be different.

Optionally, after step S220, the method may further include: receiving TCI state indication information, wherein the TCI state indication information carries a target TCI state in the TCI state table.

Of course, it should be understood that after the terminal device receives the TCI state indication information, the terminal device may perform a corresponding operation according to the TCI state indication information.

For example, in a case that the QCL type indicated by the TCI state indication information is the spatial QCL parameter, the TCI state indication information is used for beam indication. In one condition, the TCI state indication information may be used to instruct the terminal device to perform beam-training by measuring a beam and reporting a result of measuring the beam; in such a condition, the terminal device may measure a beam and report a result of the measurement based on the TCI state indication information. In another condition, the TCI state indication information may be used to indicate the terminal device to perform transmission of a control signaling, a data signal or a reference signal, including transmission of an uplink signal and reception of a downlink signal, on a corresponding beam; in such a condition, the terminal device may send or receive the control signaling, the data signal or the reference signal according to the TCI state indication information.

For example, in a case that the QCL type indicated by the TCI state indication information is the time-frequency QCL parameter, time-frequency resources for transmission of the control signaling, the data signal, the reference signal, or the like may be indicated to be selected by the terminal device. The network-side device may instruct, in downlink through the TCI state indication information, the terminal device to receive the control signaling, the data signal or the reference signal on a corresponding time-frequency resource; in such a case, the terminal device may receive the control signaling, the data signal, or the reference signal on the time-frequency resource indicated by the TCI state indication information. The network-side device may instruct, through the TCI state indication information, the terminal device to send the control signaling, the data signal, or the reference signal on the corresponding time-frequency resource in uplink; in such a case, the terminal device may send the data signal or the reference signal on the time-frequency resource indicated by the TCI state indication information.

Optionally, as one embodiment, the TCI state indication information further carries a QCL type indication and/or an RS type indication, wherein, the RS type is used to indicate the type of RS for beam measurement, selected by the terminal device, in the RS set corresponding to a target TCI state, in a case that the RSs in the RS set corresponding to the target TCI state have a plurality of RS types.

The QCL type indication is used to indicate, to the terminal device, a QCL type of a communication resource for reception or transmission, in a case that the target TCI state corresponds to a plurality of QCL types.

Optionally, pre-defined mapping relationship exists between the RS type of an RS in the RS set corresponding to the target TCI state and the QCL type corresponding to the target TCI state, each RS type corresponds to a QCL type.

Optionally, as another embodiment, in a case that the RSs in the RS set corresponding to the target TCI state have a plurality of RS types, an RS type having the highest priority level, according to a pre-defined order of priority levels of RS types, among the plurality of RS types is used as the RS type indicated to be selected by the terminal device.

Optionally, as yet another embodiment, in a case that at least one QCL type corresponding to the target TCI state in the TCI state table corresponds to a plurality of RS types, an RS type having the highest priority level, according to a pre-defined order of priority levels of RS types, among the plurality of RS types corresponding to the at least one QCL type carried in the TCI state indication information is used as the RS type indicated to be selected by the terminal device.

Optionally, as yet another embodiment, in a case that the target TCI state is used to indicate a TCI state of a control channel, the TCI state indication information is received through a Radio Resource Control (RRC) protocol message, or is obtained through receiving a RRC message and a Media Access Control (MAC) Control Element (CE) message.

Optionally, as yet another embodiment, in a case that the target TCI state is used to indicate a TCI state of a data channel, the TCI state indication information is received through a Downlink Control Information (DCI) message.

Optionally, as yet another embodiment, in a case that the target TCI state is used to indicate the TCI state of a data channel, the TCI state indication information is received through an RRC message, or is obtained through receiving an RRC message and a MAC CE message.

Further, in a case that reception for indicating the TCI state of a data channel is performed and the TCI state needs to be transmitted through the DCI message and a signaling field for sending the TCI state is disabled in the DCI message, the methods further includes: before receiving the DCI message, receiving an indication of enabling the signaling field for sending the TCI state in the DCI message, through receiving an RRC message or a MAC CE message.

Further, in a case that the target TCI state is used to indicate a TCI state of a control channel, the target TCI state is further used to indicate the TCI state of a data channel.

Further, in a case that the target TCI state is used to indicate a TCI state of a data channel, the target TCI state is further used to indicate the TCI state of a control channel.

Optionally, as yet another embodiment, in a case that the target TCI state is used to indicate a TCI state of a reference signal and the type of the reference signal belongs to a periodic reference signal or a semi-persistent reference signal, the TCI state indication information is obtained through receiving an RRC message, or is obtained through receiving an RRC message and a MAC CE message.

Optionally, as yet another embodiment, in a case that the target TCI state is used to indicate a TCI state of a reference signal and the type of the reference signal belongs to an aperiodic reference signal, the TCI state indication information is received through a DCI message.

Optionally, as an embodiment, in a case that the target TCI state is used to indicate the TCI state of the reference signal and the reference signal is an aperiodic CSI-RS, the TCI state indication information may be received through a new DCI format other than an existing DCI format.

Optionally, as another embodiment, the TCI state indication information is received by adding a new signaling bit in the existing DCI format.

Optionally, as another embodiment, the TCI state indication information is received through a signaling bit state reserved in the existing DCI format.

In particular, in a case that the TCI state indication information is received using the DCI message, TCI state indication information indicating a TCI state of a Physical Downlink Shared Channel (PDSCH) may also be present in the DCI message.

It should be understood that in an existing DCI format for indicating a TCI state, a TCI indication field for indicating the TCI state of the PDSCH may be included. In the embodiments of the present invention, if a new signaling bit in the existing DCI format for indicating the TCI state is used to represent the TCI state of the aperiodic CSI-RS, then TCI state indication information indicating the TCI state of the aperiodic CSI-RS and TCI state indication information indicating the TCI state of the PDSCH may both exist in the DCI format.

Further, in the embodiment in which the TCI state of the aperiodic CSI-RS is indicated using the existing DCI format, the signaling bit carrying the TCI state indication information for indicating the TCI state of the aperiodic CSI-RS in the DCI message is fixed to be occupied by the indicated TCI state of the aperiodic CSI-RS, and is not allowed to be disabled through an RRC message.

Further, in the embodiment in which the TCI state of the aperiodic CSI-RS is indicated using the existing DCI format, if a beam for receiving the aperiodic CSI-RS indicated by the target TCI state and a beam indicated by TCI state indication information for the PDSCH come into effect simultaneously and are inconsistent, then the aperiodic CSI-RS is received on the beam for receiving the PDSCH.

It should be understood that the terminal device can typically be directed to only one analog beam direction within a single time duration. The single time duration herein may refer to a single subframe, or a single time slot, or a single symbol, etc., and coming into effect within the single time duration means coming into effect within the single subframe, or the single time slot, or the single symbol, etc. Taking the time slot as an example, it is assumed that a DCI indicating the TCI state of the aperiodic CSI-RS is sent in a n-th time slot and comes into effect after k slots, and it is assumed that a DCI indicating the TCI state of the PDSCH is sent in a (n+2)-th time slot and comes into effect after (k−2) time slots, then if a beam direction of a beam for receiving the aperiodic CSI-RS in an (n+k) time slot and a beam direction of a beam for receiving the PDSCH are inconsistent, then collision may occur. In this condition, the aperiodic CSI-RS may be received on the beam for receiving the PDSCH to solve a beam collision problem.

Further, in the embodiment in which the TCI state of the aperiodic CSI-RS is indicated using the existing DCI format, in a case that the TCI state indication information for the PDSCH is not included in the DCI message carrying the TCI state indication information for the aperiodic CSI-RS, then the PDSCH is received on the beam for the aperiodic CSI-RS indicated by the TCI state indication information.

Optionally, in one implementation of the embodiments of the present invention, in a case that a time interval between a time point of receiving the DCI message carrying the target TCI state for indicating the TCI state of the aperiodic CSI-RS and a time point of receiving the aperiodic CSI-RS indicated by the target TCI state is greater than or equal to a pre-configured or predefined time threshold k, then the aperiodic CSI-RS is received according to the beam indicated by the target TCI state.

Optionally, in another implementation of the embodiments of the present invention, in a case that the time interval between the time point of receiving the DCI message carrying the target TCI state for indicating the TCI state of the aperiodic CSI-RS and the time point of receiving the aperiodic CSI-RS indicated by the target TCI state is less than the pre-configured or predefined time threshold k, then: the aperiodic CSI-RS is received according to a beam used by the latest received aperiodic CSI-RS with the same resource identifier indicated by the target TCI state; or the aperiodic CSI-RS is received according to a beam used for receiving the PDSCH in the same time slot as that in which the aperiodic CSI-RS is received; or the aperiodic CSI-RS is received according to a beam used for receiving the PDSCH most recent to the time point of receiving the aperiodic CSI-RS; or the aperiodic CSI-RS is received according to a beam pre-configured or activated by an RRC message or a MAC CE message; or the aperiodic CSI-RS is received according to a PDCCH beam.

Figure 3:
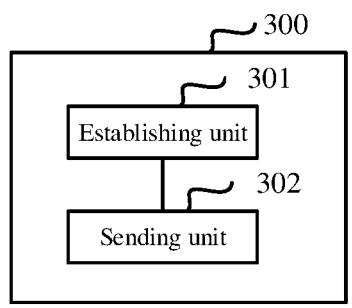
FIG. 3 is a schematic structural diagram of a network-side device according to an embodiment of the present invention.

FIG. 3 is a structural schematic diagram of a network-side device 300 according to an embodiment of the present invention. The network-side device 300 may include an establishing unit 301 and a sending unit 302.

The establishing unit 301 is used for selecting, based on a link type, a channel, an RS type, or a CORESET, at least one TCI state from a plurality of candidate TCI states configured in advance, to establish a TCI state table; the TCI state table includes correspondence relationship between a TCI state and an RS set, or correspondence relationship among the TCI state, the RS set, and a Quasi-Co-Location (QCL) type. The sending unit 302 is used for sending the TCI state table and an identifier of the link type, the channel, the RS type or the CORESET corresponding to the TCI state table.

The network-side device 300 provided in the embodiment of the present invention can implement various processes implemented by the terminal device in the method embodiment of FIG. 1, and will not be described here again to avoid duplication.

In the embodiment of the present invention, the network-side device 300 can establish a corresponding TCI state table based on the link type, the channel, the RS type, or the CORESET, and thus may configure the corresponding TCI state table for the terminal device according to requirements of application scenarios, and satisfy TCI state indication requirements in various scenarios.

Figure 4:
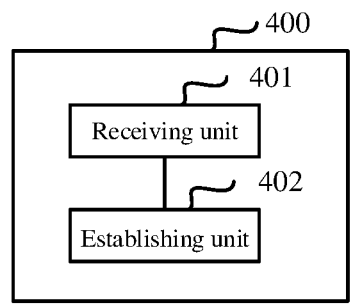
FIG. 4 is a schematic structural diagram of a terminal device according to an embodiment of the present invention.

FIG. 4 is a structural schematic diagram of a terminal device 400 according to an embodiment of the present invention. The terminal device 400 may include a receiving unit 401 and an establishing unit 402.

The receiving unit 401 is used for receiving a TCI state table and an identifier of a link type, a channel, a RS type or a CORESET corresponding to the TCI state table, wherein the TCI state table is generated by a network-side device through selecting, based on the link type, the channel, the RS type or the CORESET, at least one TCI state from a plurality of candidate TCI states configured in advance, the TCI state table includes correspondence relationship between a TCI state and an RS set, or correspondence relationship among the TCI state, the RS set, and a QCL type. The establishing unit 402 is used for establishing a TCI state table corresponding to the link type, the channel, the RS type or the CORESET based on the TCI state table and the identifier of the link type, the channel, the RS type or the CORESET corresponding to the TCI state table.

The establishing unit 402 establishes a TCI state table corresponding to the link type, channel, RS type or CORESET according to the TCI state table and the identifier of the link type, channel, RS type or CORESET corresponding to the TCI state table.

The terminal device provided in the embodiment of the present invention can realize various processes implemented by the terminal device in the method embodiment of FIG. 2, and will not be repeated here to avoid repetition.

In the embodiment of the present invention, the terminal device 400 can establish the TCI state table of the terminal device by receiving activation information of the corresponding TCI state table established by the network-side device based on the link type, the channel, the RS type, or the CORESET, etc., and accordingly, the corresponding TCI state table may be configured for the terminal device according to requirements of application scenarios, so as to meet TCI state indication requirements in various scenarios.

Figure 5:
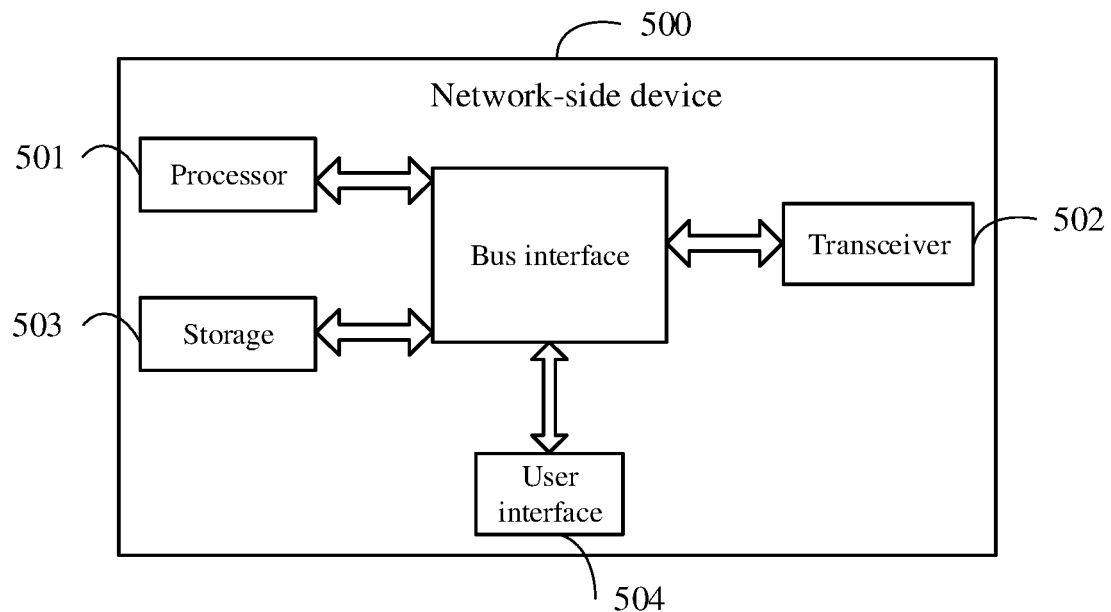
FIG. 5 is a schematic structural diagram of a network-side device according to an embodiment of the present invention.

FIG. 5 is a structural schematic diagram of a network-side device according to an embodiment of the present invention.

Referring to FIG. 5, FIG. 5 is a structural diagram of a network-side device to which the embodiments of the present invention are applied, and details of the method in the embodiment shown in FIG. 1 can be realized, and the same effect can be achieved. As shown in FIG. 5, the network-side device 500 includes a processor 501, a transceiver 502, a storage 503, a user interface 504, and a bus interface, wherein, in some embodiments of the present invention, the network-side device 500 further includes a computer program stored on the storage 503 and executable by the processor 501, and when the computer program is executed by the processor 501, the processor 501 implements following steps: selecting, based on a link type, a channel, an RS type, or a CORESET, at least one TCI state from a plurality of candidate TCI states configured in advance, to establish a TCI state table, wherein the TCI state table includes correspondence relationship between a TCI state and an RS set, or correspondence relationship among the TCI state, the RS set, and a Quasi-Co-Location (QCL) type; sending the TCI state table and an identifier of the link type, the channel, the RS type or the CORESET corresponding to the TCI state table.

In FIG. 5, a bus architecture may include any number of interconnected buses and bridges, specifically various circuits including one or more processors represented by the processor 501 and a storage represented by the storage 503 are linked together. The bus architecture may also link together various other circuits, such as peripheral devices, voltage regulators, and power management circuits, which are well known in the art, and thus will not be described further herein. A bus interface provides an interface. The transceiver 502 may be a plurality of elements, i.e., including a transmitter and a receiver, for providing a unit for communicating with various other devices over a transmission medium. For different user devices, the user interface 504 may also be an interface capable of interfacing externally or internally with a desired device including, but not limited to, a keypad, a display, a speaker, a microphone, a joystick, etc.

The processor 501 is responsible for managing the bus architecture and general processing, and the storage 503 may store data used by the processor 501 when the processor 501 performs operations.

In the embodiment of the present invention, the network-side device 500 establishes a corresponding TCI state table based on the link type, the channel, the RS type, the CORESET or the like. Thus, the corresponding TCI state table can be configured for the terminal device according to requirements of application scenarios, and further TCI state indication requirements in various scenarios may be satisfied.

The embodiments of the present invention also provide a computer readable storage medium. A computer program is stored on the computer readable storage medium. When the computer program is executed by a processor, the processor implements various processes of the above-described method embodiment shown in FIG. 1, and the same technical effect can be achieved. In order to avoid duplication, various processes of the above-described method embodiment shown in FIG. 1 will not be described here. The computer readable storage medium is, for example, a Read-Only Memory (ROM), a Random Access Memory (RAM), a magnetic disk or a compact disc.

Figure 6:
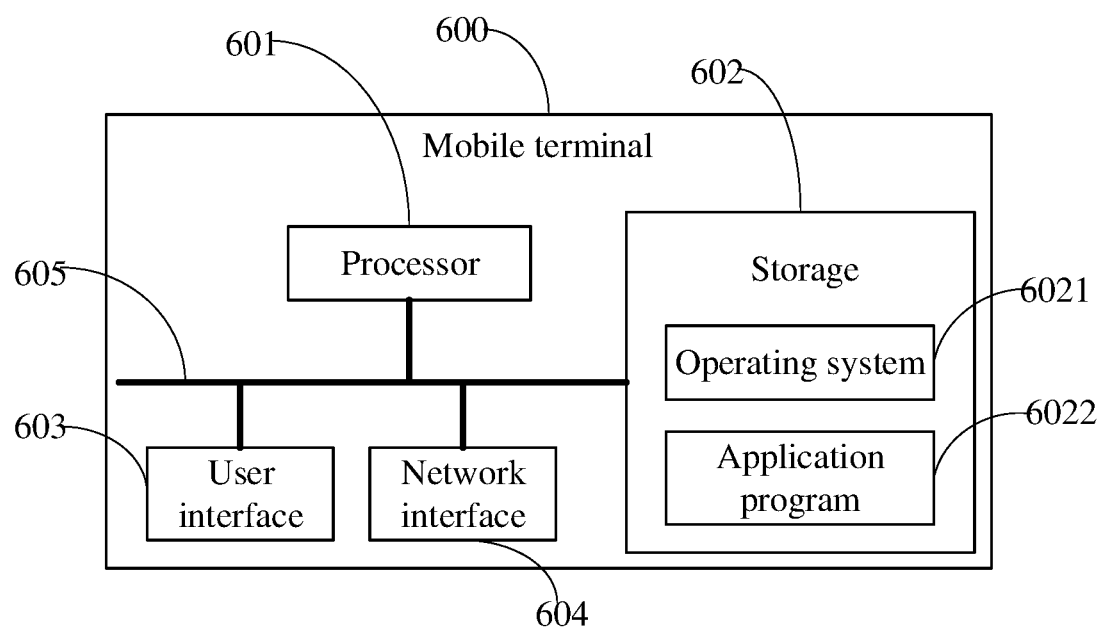
FIG. 6 is a schematic structural diagram of a terminal device according to an embodiment of the present invention.

FIG. 6 is a block diagram of a terminal device according to an embodiment of the present invention. The terminal device 600 shown in FIG. 6 includes at least one processor 601, a storage 602, at least one network interface 604, and a user interface 603. The components in the terminal device 600 are coupled together by a bus system 605. It will be appreciated that the bus system 605 is used to enable connection communication among these components. The bus system 605 includes a data bus, a power bus, a control bus, and a state signal bus. However, for sake of clear illustration, various buses are labeled as the bus system 605 in FIG. 6.

The user interface 603 may include a display, a keyboard, or a pointing device (e.g., a mouse, a trackball, a touchpad, a touch screen, or the like).

It will be appreciated that the storage 602 in the embodiments of the present invention may be a volatile storage or a non-volatile storage, or may include both volatile and non-volatile storages. The nonvolatile storage may be a Read-Only Memory (ROM), a Programmable ROM (PROM), an Erasable PROM (EPROM), an Electrically EPROM (EEPROM) or a flash storage. The volatile storage may be a Random Access Memory (RAM), which serves as an external cache. By way of example but not limitation, many forms of RAMs are available, such as a Static RAM (SRAM), a Dynamic RAM (DRAM), a Synchronous DRAM (SDRAM), a Double Data Rate SDRAM (DDRS-DRAM), an Enhanced SDRAM (ESDRAM), a Synchlink DRAM (SLDRAM), and a DirectRambusRAM (DRRAM). The storage 602 in the system and the method described by the embodiments of the present invention is intended to include, but is not limited to, these and any other suitable types of storage.

In some embodiments, the storage 602 stores the following elements, executable modules or data structures, or a subset thereof, or an extended set thereof: an operating system 6021 and an application program 6022.

The operating system 6021 includes various system programs, such as a framework layer, a core library layer, a driver layer, and the like, for implementing various basic services and processing hardware-based tasks. The application program 6022 includes various application programs, such as a Media Player, a Browser, and the like, for implementing various application services. A program implementing the methods of some embodiments of the present invention can be included in the application program 6022.

In some embodiments of the present invention, the terminal device 600 further includes: a computer program stored on the storage 602 and executable by the processor 601. In a case that the computer program is executed by the processor 601, the processor 601 implements following steps: receiving a TCI state table and an identifier of a link type, a channel, a RS type or a CORESET corresponding to the TCI state table, wherein the TCI state table is generated by a network-side device through selecting, based on the link type, the channel, the RS type or the CORESET, at least one TCI state from a plurality of candidate TCI states configured in advance, the TCI state table includes correspondence relationship between a TCI state and an RS set, or correspondence relationship among the TCI state, the RS set, and a QCL type; establishing a TCI state table corresponding to the link type, the channel, the RS type or the CORESET based on the TCI state table and the identifier of the link type, the channel, the RS type or the CORESET corresponding to the TCI state table.

The method disclosed in the embodiment of FIG. 2 of the present invention described above may be applied in or implemented by the processor 601. The processor 601 may be an integrated circuit chip having signal processing capability. In an implementation process, steps of the above-described method may be performed by an integrated logic circuit of hardware in the processor 601 or by instructions in a form of software. The processor 601 described above may be a general-purpose processor, a Digital Signal Processor (DSP), an Application Specific Integrated Circuit (ASIC), a Field Programmable Gate Array (FPGA), or other programmable logic devices, discrete gates or transistor logic devices, discrete hardware components. The methods, steps, and logical block diagrams disclosed in the embodiments of the present invention may be implemented or performed. The general-purpose processor may be a microprocessor or the processor may also be any conventional processor or the like. The steps of the method disclosed in connection with the embodiments of the present invention may be embodied directly as execution by a hardware decoding processor or by a combination of hardware in the decoding processor and software modules. Software modules may be located in computer readable storage media mature in the art such as a random access memory, a flash memory, a read only memory, a programmable read only storage, or an electrically erasable programmable storage, a register, etc. The computer readable storage medium is located in the storage 602, the processor 601 reads information in the storage 602, and performs the steps of the above method in conjunction with its hardware. In particular, the computer readable storage medium stores a computer program and in a case that the computer program is executed by the processor 601, the processor implements the steps of the method embodiments as described above in FIG. 1.

It will be appreciated that the embodiments described herein may be implemented in hardware, software, firmware, middleware, microcode, or a combination thereof. if implemented in hardware, a processing unit may be implemented in one or more Application Specific Integrated Circuits (ASIC), a Digital Signal Processor (DSP), a DSP Device (DSPD), a Programmable Logic Device (PLD), a Field-Programmable Gate Array (FPGA), a general purpose processor, a controller, a microcontroller, a microprocessor, other electronic units for performing functions of the present invention, or combinations thereof.

If implemented by software, techniques described in the embodiments of the present invention may be implemented by means of modules (e.g., processes, functions, etc.) that perform the functions described in the embodiments of the present invention. Software codes may be stored in a storage and executed by a processor. The storage may be implemented in the processor or external to the processor.

The terminal device 600 can implement various processes implemented by the terminal device in the foregoing embodiment, and the various processes will not be described here in detail in order to avoid repetition.

In the embodiments of the present invention, the terminal device 600 can establish the TCI state table of the terminal device by receiving activation information of the corresponding TCI state table established by the network-side device based on the link type, the channel, the RS type, or the CORESET, etc., and accordingly, the corresponding TCI state table may be configured for the terminal device according to requirements of application scenarios, so as to meet TCI state indication requirements in various scenarios.

It should be noted that such terms as "include", "comprise" or any other variant thereof are intended to encompass non-exclusive inclusion such that processes, methods, articles, or devices including a series of elements not only include those elements, but also include other elements that are not explicitly listed, or include elements inherent to such processes, methods, articles, or devices. In the absence of further limitations, an element after such a statement as "including one of" and any variant thereof is not excluded from coexistence of another identical element in the process, method, article, or device that includes the element.

From the above description of the embodiments, it will be apparent to those skilled in the art that the methods of the above embodiments may be implemented by means of software plus a common necessary hardware platform, although the methods of the above embodiments may also be implemented by hardware as well, but in many cases, the former is a better embodiment. Based on this understanding, an essential part, or a part contributing to the related art, of technical solutions of the present invention may be embodied in the form of a software product. The computer software product is stored in a storage medium such as an ROM/RAM a magnetic disk, an optical disc, which includes a plurality of instructions used to cause a terminal device (which may be a mobile phone, a computer, a server, an air-conditioner, or a network device, etc.) to perform the methods of various embodiments of the present invention.

The embodiments of the present invention have been described above with reference to the accompanying drawings. However, the present invention is not limited to the specific embodiments described above, which are merely illustrative and not limiting. Those skilled in the art may, under teachings of the present invention, make many changes to forms within the protection scope of the present invention without departing from the spirit of the present invention and the protection scope of the claims.

What is claimed is:

1. A method of sending a transmission configuration indication (TCI) state, applied to a network-side device, comprising: selecting, based on a link type, a channel, a Reference Signal (RS) type, or a Control Resource Set (CORESET), at least one TCI state from a plurality of candidate TCI states configured in advance, to establish a TCI state table, wherein, the TCI state table comprises correspondence relationship between the TCI state and an RS set, correspondence relationship among the TCI state, the RS set, and a Quasi-Co-Location (QCL) type, or correspondence relationship between the TCI state and a channel type;

sending the TCI state table and an identifier of the link type, the channel, the RS type or the CORESET corresponding to the TCI state table;

wherein after sending the TCI state table and the identifier of the link type, the channel, the RS type or the CORESET corresponding to the TCI state table, the method further comprises:

sending TCI state indication information, wherein the TCI state indication information carries a target TCI state in the TCI state table.

2. The method according to claim 1, wherein, before establishing the TCI state table, the method further comprises: sending configuration information corresponding to a plurality of candidate TCI states based on the link type;

wherein the plurality of candidate TCI states configured based on an uplink and the plurality of candidate TCI states configured based on a downlink are same or different.

3. The method according to claim 1, wherein, in a case that the TCI state table comprises the correspondence relationship between the TCI state and the RS set, each TCI state in the TCI state table corresponds to one or more RS sets, each RS set comprises one or more RSs.

4. The method according to claim 1, wherein, in a case that the TCI state table comprises the correspondence relationship among the TCI state, the RS set, and the QCL type, each TCI state in the TCI state table corresponds to a QCL type; or in a case that the TCI state table comprises the correspondence relationship among the TCI state, the RS set, and the QCL type, each RS set in the TCI state table corresponds to a QCL type; or in a case that the TCI state table comprises the correspondence relationship among the TCI state, the RS set, and the QCL type, at least one RS set in the TCI state table corresponds to a plurality of QCL types.

5. The method according to claim 1, wherein, in a case that the target TCI state is used to indicate the TCI state of a control channel, the TCI state indication information is sent through a Radio Resource Control (RRC) message, or is sent jointly through a RRC message and a Media Access Control (MAC) Control Element (CE) message; or in a case that the target TCI state is used to indicate the TCI state of a data channel, the TCI state indication information is sent through a Downlink Control Information (DCI) message or the TCI state indication information is sent through an RRC message, or is sent jointly through an RRC message and a MAC CE message;

wherein if the TCI state of the data channel is to be sent and the TCI state needs to be sent through the DCI message and a signaling field for sending the TCI state is disabled in the DCI message, then before sending the DCI message, the methods further comprises: indicating, through sending an RRC message or a MAC CE message, the signaling field for sending the TCI state to be enabled in the DCI message.

6. The method according to claim 1, wherein, in a case that the target TCI state is used to indicate the TCI state of a reference signal and a type of the reference signal belongs to a periodic reference signal or a semi-persistent reference signal, the TCI state indication information is sent through an RRC message, or is sent jointly through an RRC message and a MAC CE message;

in a case that the target TCI state is used to indicate the TCI state of the reference signal and the type of the reference signal belongs to an aperiodic reference signal, the TCI state indication information is sent through a DCI message.

7. A network-side device, comprising: a processor; and a storage configured to store a computer-executable instruction, wherein when the computer-executable instructions is executed, the processor performs the method according to 1.

8. A method of sending a transmission configuration indication (TCI) state, applied to a terminal device, comprising: receiving a TCI state table and an identifier of a link type, a channel, a Reference Signal (RS) type or a Control Resource Set (CORESET) corresponding to the TCI state table, wherein the TCI state table is generated by a network-side device through selecting, based on the link type, the channel, the RS type or the CORESET, at least one TCI state from a plurality of candidate TCI states configured in advance, the TCI state table comprises correspondence relationship between a TCI state and an RS set, or correspondence relationship among the TCI state, the RS set, and a QCL type, or correspondence relationship between the TCI state and a channel type;

establishing a TCI state table corresponding to the link type, the channel, the RS type or the CORESET based on the TCI state table and the identifier of the link type, the channel, the RS type or the CORESET corresponding to the TCI state table;

wherein, after establishing the TCI state table, the method further comprises: receiving TCI state indication information, wherein the TCI state indication information carries a target TCI state in the TCI state table.

9. The method according to claim 8, wherein, in a case that the TCI state table comprises the correspondence relationship between the TCI state and the RS set, each TCI state in the TCI state table corresponds to one or more RS sets, and each RS set comprises one or more RSs;

in a case that one RS set of the one or more RS sets comprises a plurality of RSs, types of the plurality of RSs comprised in the RS set are same or different.

10. The method according to claim 8, wherein, in a case that the TCI state table comprises the correspondence relationship among the TCI state, the RS set, and the QCL type, each TCI state in the TCI state table corresponds to a QCL type; or in a case that the TCI state table comprises the correspondence relationship among the TCI state, the RS set, and the QCL type, each RS set in the TCI state table corresponds to a QCL type; or in a case that the TCI state table comprises the correspondence relationship among the TCI state, the RS set, and the QCL type, at least one RS set in the TCI state table corresponds to a plurality of QCL types.

11. The method according to claim 8, wherein, in a case that the target TCI state is used to indicate the TCI state of a control channel, the TCI state indication information is received through a Radio Resource Control (RRC) protocol message, or is obtained through receiving a RRC message and a Media Access Control (MAC) Control Element (CE) message; or in a case that the target TCI state is used to indicate the TCI state of a data channel, the TCI state indication information is received through an RRC message, or is obtained through receiving an RRC message and a MAC CE message, or is received through a Downlink Control Information (DCI) message.

12. The method according to claim 11, wherein, if reception for indicating the TCI state of a data channel is performed and the TCI state needs to be sent through the DCI message and a signaling field for sending the TCI state is disabled in the DCI message, then before receiving the DCI message, the methods further comprises:

receiving an indication of enabling the signaling field for sending the TCI state in the DCI message, through receiving an RRC message or a MAC CE message.

13. The method according to claim 11, wherein, in a case that the target TCI state is used to indicate the TCI state of a control channel, the target TCI state is further used to indicate the TCI state of a data channel.

14. The method according to claim 8, wherein, in a case that the target TCI state is used to indicate the TCI state of a reference signal and a type of the reference signal belongs to a periodic reference signal or a semi-persistent reference signal, the TCI state indication information is obtained through receiving a Radio Resource Control (RRC) message, or is obtained through receiving an RRC message and a Media Access Control (MAC) Control Element (CE) message, or in a case that the target TCI state is used to indicate the TCI state of a reference signal and a type of the reference signal belongs to an aperiodic reference signal, the TCI state indication information is received through a Downlink Control Information (DCI) message.

15. The method according to claim 14, wherein, if a time interval between a time point of receiving the DCI message carrying the target TCI state for indicating the TCI state of the aperiodic CSI-RS and a time point of receiving the aperiodic CSI-RS indicated by the target TCI state is greater than or equal to a pre-configured or predefined time threshold k, then receiving the aperiodic CSI-RS by the terminal device according to a beam indicated by the target TCI state.

16. The method according to claim 14, wherein, if a time interval between a time point of receiving the DCI message carrying the target TCI state for indicating the TCI state of the aperiodic CSI-RS and a time point of receiving the aperiodic CSI-RS indicated by the target TCI state is less than a pre-configured or predefined time threshold k, then:

receiving the aperiodic CSI-RS according to a beam, wherein the beam is used by the latest received aperiodic CSI-RS with a same resource identifier indicated by the target TCI state; or receiving the aperiodic CSI-RS according to a beam used for receiving a Physical Downlink Shared Channel (PDSCH) in a same time slot as that in which the aperiodic CSI-RS is received; or receiving the aperiodic CSI-RS according to a beam used for receiving the PDSCH most recent to a time point of receiving the aperiodic CSI-RS; or receiving the aperiodic CSI-RS according to a beam pre-configured or activated by an RRC message or a MAC CE message; or receiving the aperiodic CSI-RS according to a Physical Downlink Control Channel (PDCCH) beam.

17. The method according to claim 14, wherein, if the TCI state table is a TCI state table corresponding to a Physical Uplink Control Channel (PUCCH), and the TCI state table comprises correspondence relationship between the TCI state and the channel type, the target TCI state indicates that a same QCL parameter is used for both the PUCCH and the channel type.

18. A terminal device, comprising: a processor; and a storage configured to store a computer-executable instruction, wherein when the computer-executable instructions is executed, the processor performs a method of sending a transmission configuration indication (TCD) state, applied to a terminal device, comprising:

receiving a TCI state table and an identifier of a link type, a channel, a Reference Signal (RS) type or a Control Resource Set (CORESET) corresponding to the TCI state table, wherein the TCI state table is generated by a network-side device through selecting, based on the link type, the channel, the RS type or the CORESET, at least one TCI state from a plurality of candidate TCI states configured in advance, the TCI state table comprises correspondence relationship between a TCI state and an RS set, or correspondence relationship among the TCI state, the RS set, and a QCL type, or correspondence relationship between the TCI state and a channel type;

establishing a TCI state table corresponding to the link type, the channel, the RS type or the CORESET based on the TCI state table and the identifier of the link type, the channel, the RS type or the CORESET corresponding to the TCI state table;

receiving TCI state indication information, wherein the TCI state indication information carries a target TCI state in the TCI state table.

19. The terminal device according to claim 18, wherein, in a case that the target TCI state is used to indicate the TCI state of a control channel, the TCI state indication information is received through a Radio Resource Control (RRC) protocol message, or is obtained through receiving a RRC message and a Media Access Control (MAC) Control Element (CE) message; or in a case that the target TCI state is used to indicate the TCI state of a data channel, the TCI state indication information is received through an RRC message, or is obtained through receiving an RRC message and a MAC CE message, or is received through a Downlink Control Information (DCI) message.

20. The terminal device according to claim 18, wherein, in a case that the target TCI state is used to indicate the TCI state of a reference signal and a type of the reference signal belongs to a periodic reference signal or a semi-persistent reference signal, the TCI state indication information is obtained through receiving a Radio Resource Control (RRC) message, or is obtained through receiving an RRC message and a Media Access Control (MAC) Control Element (CE) message, or in a case that the target TCI state is used to indicate the TCI state of a reference signal and a type of the reference signal belongs to an aperiodic reference signal, the TCI state indication information is received through a Downlink Control Information (DCI) message.

* * * * *